US012030094B2

(12) United States Patent
Kuepper

(10) Patent No.: US 12,030,094 B2
(45) Date of Patent: Jul. 9, 2024

(54) ACOUSTO-VIBRATORY SENSOR CLEANING

(71) Applicant: VOLKSWAGEN AKTIENGESELLSCHAFT, Wolfsburg (DE)

(72) Inventor: Philipp Nils Kuepper, Sacramento, CA (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 77 days.

(21) Appl. No.: 17/561,646

(22) Filed: Dec. 23, 2021

(65) Prior Publication Data

US 2023/0201890 A1 Jun. 29, 2023

(51) Int. Cl.

| | |
|---|---|
| ***B08B 7/02*** | (2006.01) |
| ***B08B 5/02*** | (2006.01) |
| ***B08B 17/06*** | (2006.01) |
| ***B60S 1/54*** | (2006.01) |
| ***B60S 1/56*** | (2006.01) |
| ***G01S 7/497*** | (2006.01) |

(52) U.S. Cl.

CPC ................ *B08B 7/026* (2013.01); *B08B 5/02* (2013.01); *B08B 17/065* (2013.01); *B60S 1/54* (2013.01); *B60S 1/56* (2013.01); *G01S 7/497* (2013.01); *G01S 2007/4977* (2013.01)

(58) Field of Classification Search

CPC ......... B08B 7/026; B08B 5/02; B08B 17/065; B08B 17/02; B08B 7/028; B60S 1/54; B60S 1/56; B60S 1/02; B60S 1/485; G01S 7/497; G01S 2007/4977; G01S 17/931

See application file for complete search history.

(56) References Cited

U.S. PATENT DOCUMENTS

| | | | | |
|---|---|---|---|---|
| 9,795,966 | B2 * | 10/2017 | Umbanhowar | C08B 15/02 |
| 10,780,861 | B2 | 9/2020 | Herman et al. | |
| 11,167,325 | B2 * | 11/2021 | Ponomarev | B08B 7/04 |
| 11,279,287 | B2 * | 3/2022 | Boegel | B60R 1/06 |
| 11,300,533 | B2 * | 4/2022 | Chung | G02B 26/00 |
| 11,693,235 | B2 * | 7/2023 | Revier | G01H 13/00<br>134/58 R |
| 2017/0120249 | A1 * | 5/2017 | Umbanhowar | C08B 15/05 |

(Continued)

*Primary Examiner* — Duy Vu N Deo
*Assistant Examiner* — Christopher Remavege
(74) *Attorney, Agent, or Firm* — Shield Intellectual Property PC; Kirk D. Wong

(57) ABSTRACT

Approaches, techniques, and mechanisms are disclosed for sensor cleaning systems. A region of a sensor window is identified to be blocked by an obscurant. The location of the region is determined using the sensor associated with the sensor window. An acousto-vibratory cleaning system receives the location of the region and produces a fluid droplet to be dispensed at a specified point on a two-dimensional plane of the surface of the sensor window. Sonic actuators are activated to capture the fluid droplet in acoustic levitation. Acoustic forces guide the fluid droplet to the region being obscured. Once the fluid droplet is in cleaning position, vibration of the sensor window is activated to incrementally clear the obscurant by vibrating the droplet along the obscurant. The acousto-vibratory cleaning system generates additional acoustic forces to guide the contaminated fluid droplet to a closest drainage canal.

20 Claims, 12 Drawing Sheets

(56) References Cited

U.S. PATENT DOCUMENTS

| | | | | |
|---|---|---|---|---|
| 2018/0264526 | A1* | 9/2018 | Kim | B01L 3/502792 |
| 2019/0106085 | A1 | 4/2019 | Bacchus et al. | |
| 2020/0086346 | A1* | 3/2020 | Kobrin | G02B 27/0006 |
| 2020/0180567 | A1* | 6/2020 | Sakai | B60S 1/52 |
| 2020/0276579 | A1* | 9/2020 | Huang | B01L 3/502761 |
| 2020/0346620 | A1* | 11/2020 | Chung | B60S 1/02 |
| 2022/0266316 | A1* | 8/2022 | Chung | B08B 11/04 |
| 2022/0340103 | A1* | 10/2022 | Peret | B06B 1/0622 |

* cited by examiner

ACOUSTO-VIBRATORY SENSOR CLEANING

TECHNICAL FIELD

Embodiments relate generally to sensor cleaning, and, more specifically, to techniques for acousto-vibratory sensor cleaning.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern vehicles have optical sensor systems, such as cameras and LIDAR sensors, that require cleaning for optimal performance. For automated driving, sensors need to be cleaned automatically with no human intervention. However, existing cleaning solutions use cleaning components such as dedicated mechanical wipers or brushes, pressurized fluid and/or pressurized gases. Combinations of fluid-based and mechanical systems are common, however full automation and new sensor modalities such as LIDAR have posed new challenging requirements.

Nevertheless, various methods have been developed to avoid damaging the various types of sensors. These approaches include, but are not limited to, fluid-based solutions using tens to hundreds of milliliters of cleaning fluid to globally spray the sensor surface, gas-based systems that use pressurized air to steer a strong jet of gas toward a particular surface location to remove surface contaminants, mechanical systems that use brushes or wipers to clean dirt and other obscurants from a sensor window, or a combination of the three. Challenges related to resource efficiency and sensor availability are driving factors for the development of new sensor cleaning solutions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
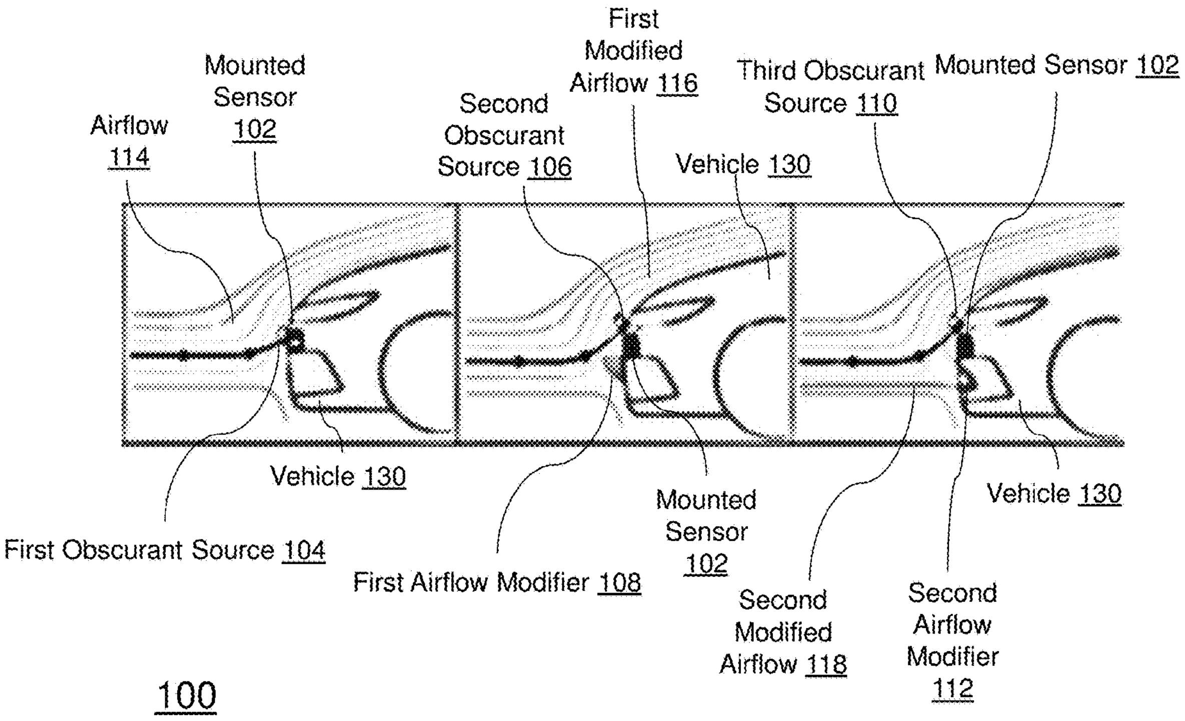
FIG. 1 is an illustrative view of various aspects of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
  2.1. Vehicle Computing System
  2.2. Acousto-Vibratory Cleaning System
  2.3. Sonic Actuators
  2.4. Mounted Sensor Vibration System
  2.5. Miscellaneous
3.0. Functional Overview
  3.1. Obscurant Detection
  3.2. Acoustic Levitation
  3.3. Sensor Vibration
  3.4. Multiple Droplet Sensor Cleaning
4.0. Example Process Flows
5.0. Implementation Mechanism—Hardware Overview
6.0. Extensions and Alternatives 1.0. General Overview Techniques as described herein can be used to implement acousto-vibratory sensor cleaning. A vehicle includes a vehicle computing system that further includes an acousto-vibratory cleaning system. A mounted sensor, such as a camera or LIDAR sensor, includes sonic actuators and a mounted sensor vibration system. The acousto-vibratory cleaning system includes a sonic actuator controller, fluid dispenser system, and a mounted sensor vibration system for the purpose of implementing acousto-vibratory sensor cleaning. As used herein, vehicular data refers to a mix of real-time, or time sensitive data and non-time sensitive data that is generated from one or more computing systems at a vehicle. Vehicle applications operating on a vehicle operating system may generate vehicle data attributes. Example data attributes may include, but are not necessarily limited to only, any of: time-sensitive data, non-time sensitive data, geolocation data, mechanical vehicular data, operational vehicular data, other metadata related to vehicles, etc. Example data parsing methods include but are not necessarily limited to clustering methods, temporal data filtering, geographic location tags, etc. On-board vehicle sensors may be used in the detection of obscurants on the sensors.

A mounted sensor may be configured on a vehicle such that airflow is redirected to avoid turbulent air flows on the mounted sensor. An aerodynamic design is chosen to create an air curtain passively. Using one or more airflow modifiers, such as a physical airflow deflector below the mounted sensor or a molded concave bumper below the mounted sensor to redirect airflow and obscurant sources away from the mounted sensor.

Using a combination of acoustic forces generated by multiple sonic actuators, a fluid droplet may be levitated against the surface of a sensor window. By modulating the amplitude, frequency and phase of the soundwaves in a defined manner, acoustic levitation of the fluid droplet at the fluid outlet can be achieved. Once the fluid droplet is captured by the acoustic forces into acoustic levitation, a series of acoustic forces may be applied to the fluid droplet to steer the fluid droplet towards a region identified to be obscured. The obscurant, such as dirt or debris, may occupy a portion or all of the region identified by the sensor. Once the fluid droplet reaches the region being obscured, or the cleaning position, a vibration system at the mounted sensor is activated to incrementally clean the surface of the sensor window.

The sensor window is brought into oscillating vibratory motion once the droplet reaches the cleaning position. Using a fluid droplet on a vibrating sensor window surface, the droplet becomes a micro-mechanical cleaning device. Using a hydrophobic surface coating, the contact angle of the cleaning solution on the optical surface is optimized. The amplitude and frequency of this vibration is optimized based on the fluid properties, such as droplet resonance modes, interaction between the fluid and the optical surface, as well as the interaction between the acoustic transducers and the droplet. The droplet will vibrate on the sensor surface, effectively capturing obscurants from the sensor window. Once the droplet has been "used" or "contaminated," meaning that the obscurant has been cleared by the droplet, the contaminated droplet is guided away from the sensor surface into drainage ports or canals, outside the field of view of the sensor. The used droplet is guided away through the acoustic forces being applied onto the used droplet.

Resource consumption in prior approaches is substantial, resulting in requirements for large water reservoirs, need for compressors and gas tanks in the vehicle, and a significant power consumption. The acousto-vibratory sensor cleaning requires few resources in comparison. This approach requires only microliters of fluid compared with tens or even hundreds of milliliters of water as seen in prior solutions. The main resource used is electrical power to drive the vibration of the sensor window and the acoustic transducer modules around the optical window.

This approach enables acousto-vibratory sensor cleaning as described herein to efficiently remove obscurants from sensor surfaces without unnecessary obstruction of the sensor. Additionally, optionally or alternatively, this approach automation of sensor cleaning that does not require human intervention. Furthermore, prior solutions of vibrating surfaces to actuate the process of self-cleaning has been limited to horizontally configured sensors, such as solar panels, having inclinations of no more than 15 degrees. Here, the vibrating surface of a sensor is combined with acoustic levitation to support self-cleaning of a sensor situated vertically, thus enabling automated cleaning of self-driving vehicles.

Approaches, techniques, and mechanisms are disclosed for sensor cleaning systems. According to one embodiment, a region of a sensor window is identified to be blocked by an obscurant. The location of the region is determined using the sensor associated with the sensor window. An acousto-vibratory cleaning system receives the location of the region and produces a fluid droplet to be dispensed at a specified point on a two-dimensional plane of the surface of the sensor window. Sonic actuators are activated to capture the fluid droplet in acoustic levitation. A series of acoustic forces guide the fluid droplet to the region being obscured based on the received location. Once an indication that the fluid droplet has reached the region is received, vibration of the sensor window is activated to incrementally clear the obscurant by guiding the droplet along the obscurant. Based on an indication that the region has been cleaned by the droplet, the acousto-vibratory cleaning system generates additional acoustic forces to guide the contaminated fluid droplet to a closest drainage canal.

In other aspects, the invention encompasses computer apparatuses and computer-readable media configured to carry out the foregoing techniques.

2.0. Structural Overview

Figure 3:
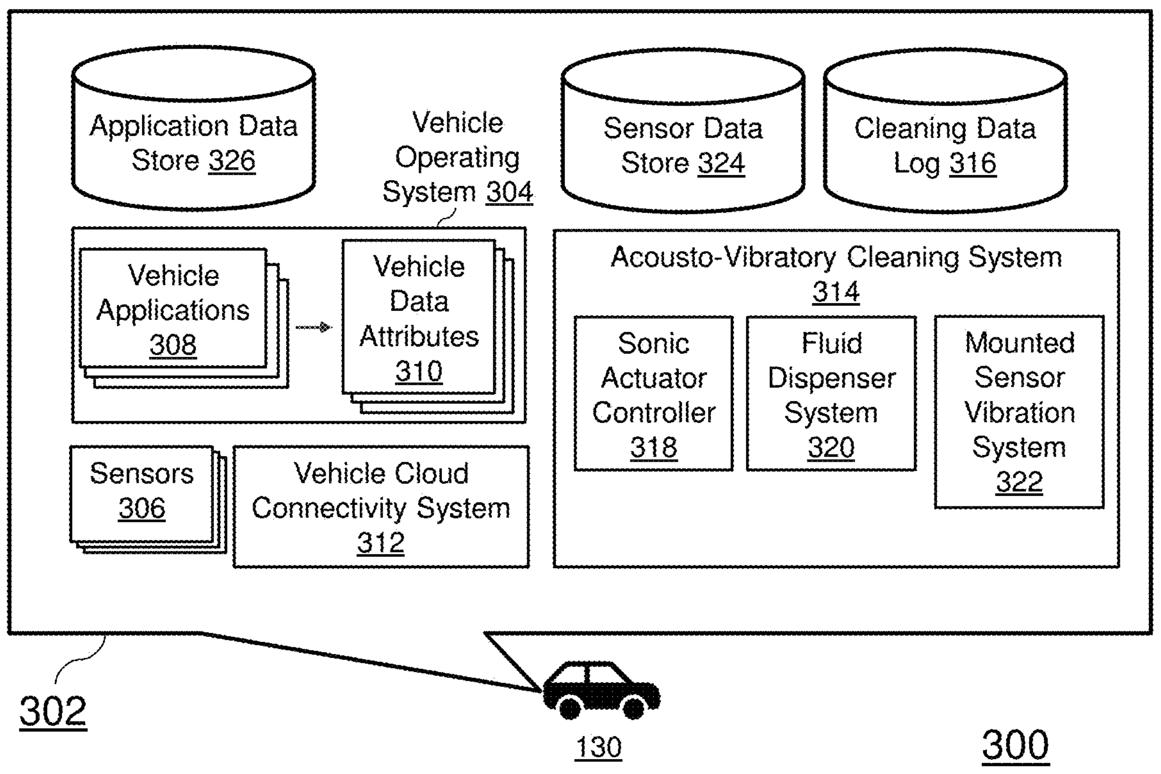
FIG. 3 illustrates an example block diagram for vehicle equipped with an acousto-vibratory cleaning system, illustrating an example vehicle operating system, according to an embodiment of the invention.

FIG. 1 is an illustrative view of various aspects of an example system 100 in which the techniques described herein may be practiced, according to various embodiments. System 100 comprises a vehicle 130 and a mounted sensor 102. FIG. 3 illustrates an example block diagram for vehicle equipped with an acousto-vibratory cleaning system, illustrating an example vehicle operating system. As shown in FIG. 3, the vehicle 130 may include a vehicle computing system 302 that may comprise one or more computing devices. The one or more computing devices comprise any combination of hardware and software configured to implement the various logical components described herein, including components such as vehicle operating system 304, acousto-vibratory cleaning system 314, sensors 306, vehicle cloud connectivity system 312, sensor data store 324, cleaning data log 316, and application data store 326. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Vehicle Computing System

System 300 comprises a vehicle computing system 302 that operates with one or more vehicle applications 308 on a vehicle operating system 304 to enable acousto-vibratory sensor cleaning. Example applications that may interact with data on the vehicle computing system 302 may include, but are not limited to only, any of: data analysis, data transformation, latency-critical diagnostics, vehicle monitoring, malfunction, pattern detection, dynamic event-based data source configuration, complex time and/or location-based vehicle data anonymization, on-demand provisioning of data processing stacks, dynamic workload provisioning, different cluster sizing, data infrastructure efficiency improvements, etc.

Sensors 306 include optical sensors, such as cameras and LIDAR sensors, that require a clean optical sensor window for optimal performance. One or more vehicle applications

308 may interact with the sensors 306 and the acousto-vibratory cleaning system 314 to automatically clear obscurants from the surface of a sensor window.

Returning to FIG. 1, a sensor 306 is mounted in a specific way on the vehicle such that an air curtain can be generated passively to shield the sensor 306. FIG. 1 illustrates three embodiments of a mounted sensor 102 on a vehicle 130. In the first panel, a first obscurant source 104, such as a bug or other flying debris, is caught within an airflow 114 that directly impacts the surface of the mounted sensor 102. This is sub-optimal because strong forces, due to air pressure, acting on a droplet of the acousto-vibratory cleaning system described herein would interfere with the acoustic steering of the droplet.

In the second panel illustrated in FIG. 1, a first airflow modifier 108 is installed below the mounted sensor 102, creating a first modified airflow 116. In this first modified airflow 116, a second obscurant source 106 travels above the mounted sensor 102, thus creating an air curtain that shields the mounted sensor 102 from direct air pressure from airflow due to the first airflow modifier 108. In this example embodiment, the first airflow modifier 108 comprises a convex attachment to the front bumper of the vehicle 130, deflecting the airflow above and over the mounted sensor 102, such that the second obscurant source 106 impacts an area above the mounted sensor 102 on the vehicle 130. This reduces the chance of obscurants impacting the mounted sensor 102.

In the third panel illustrated in FIG. 1, a second airflow modifier 112 is installed as part of the body of the vehicle 130. The second airflow modifier 112 comprises an indentation within the body of the vehicle 130 such that the second modified airflow 118 pushes a third obscurant source 110 away from the mounted sensor 102. Here, the third obscurant source 110 may travel in the second modified airflow 118 above and around the mounted sensor 102. Thus, an air curtain is created passively, shielding the mounted sensor 102 from direct air pressure from airflow.

Returning to FIG. 3, the vehicle computing system 302 includes the acousto-vibratory cleaning system 314, which further includes a sonic actuator controller 318, a fluid dispenser system 320, and a mounted sensor vibration system 322. The acousto-vibratory cleaning system 314 manages the sonic actuators and vibrates the surface of a sensor window of sensor to automatically clear an obscurant. The acousto-vibratory cleaning system 314 stores log data in a cleaning data log 316 and may access sensor data within a sensor data store 324 to identify obscurants on sensors 306. Additionally, a vehicle application 308 may generate application data to be stored in an application data store 326 that incorporates data generated by the acousto-vibratory cleaning system 314.

2.2. Acousto-Vibratory Cleaning System

Figure 2A:
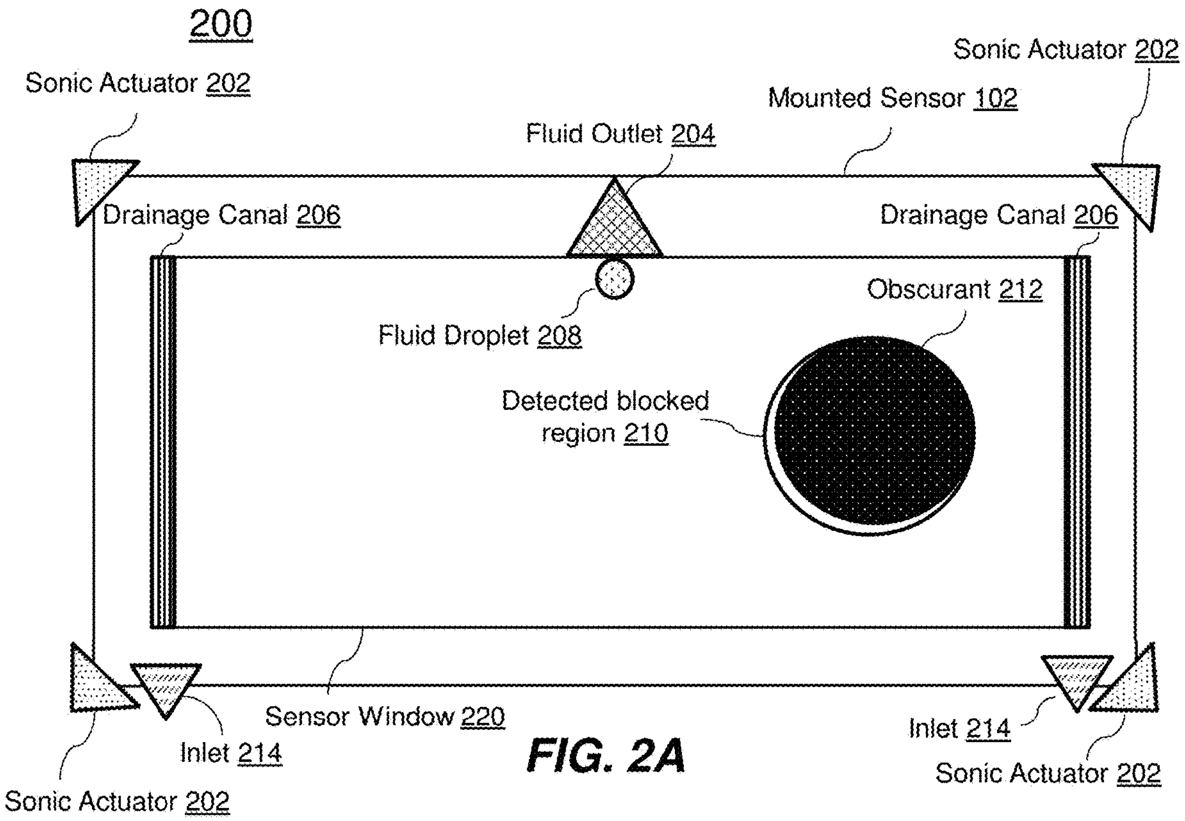
FIG. 2A illustrates an example block diagram for an acousto-vibratory cleaning system, illustrating an example obscurant, according to an embodiment of the invention.

FIG. 2A illustrates an example block diagram for an acousto-vibratory cleaning system, illustrating an example obscurant, according to an embodiment. The mounted sensor 102 includes a sensor window 220 that comprises the optical field of view of the sensor 102. At least three sonic actuators 202 are included in the system 200. As illustrated, a sonic actuator 202 is located at each corner of the mounted sensor 102 within the casing for the mounted sensor 102. A fluid outlet 204 is located at the top of the sensor window 220. In an embodiment, the fluid outlet 204 is centered on the top of the sensor window 220. A drainage canal 206 is included on the left-hand side and the right-hand side of the sensor window 220. In other embodiments, any number of drainage canals 206 may be included in the system 200, including having no drainage canal 206. An inlet 214 is included below each drainage canal 206 for disposal of the contaminated droplet. In an embodiment, the inlet 214 captures contaminated droplets and moves them to a wastewater container. In another embodiment, the droplets are released to the environment.

FIG. 2A further illustrates a fluid droplet 208 of a defined volume being released from the fluid outlet 204 onto the sensor window 220 surface. The droplet stays on the sensor window as the fluid's contact angle to the surface allows an optimized adhesion to the window. In an embodiment, at the top of the cover glass, one or more fluid outlets 204 for cleaning fluid may be found. Each outlet 204 dispenses droplets of defined volume of cleaning solution to the cleaning surface. A detected blocked region 210 is illustrated on the sensor window 220, and an obscurant 212 is illustrated within the detected blocked region 210. As described above, the sensor 102 may detect the obscurant and generate location data in the two-dimensional planar space of the sensor window 220 that defines the detected blocked region 210. While the detected blocked region 210 is illustrated as a circle in FIG. 2A, other shapes may be used, such as simple geometric shapes like squares, ovals, and rectangles, as well as non-geometric shapes that lack symmetry. For illustration purposes, the obscurant 212 has been depicted as a simple circle shape within the detected blocked region 210, yet the obscurant 212 is more likely to be a non-geometric shape that does not fit neatly within the bounds of the detected blocked region 210.

At least three acoustic transducers, or sonic actuators 202, are arranged to capture the droplet 208 and guide it to the obscured part of the sensor surface. Soundwaves are modulated to a specified frequency, amplitude, and phase in order to capture the droplet 208 in acoustic levitation.

2.3. Sonic Actuators

Figure 2B:
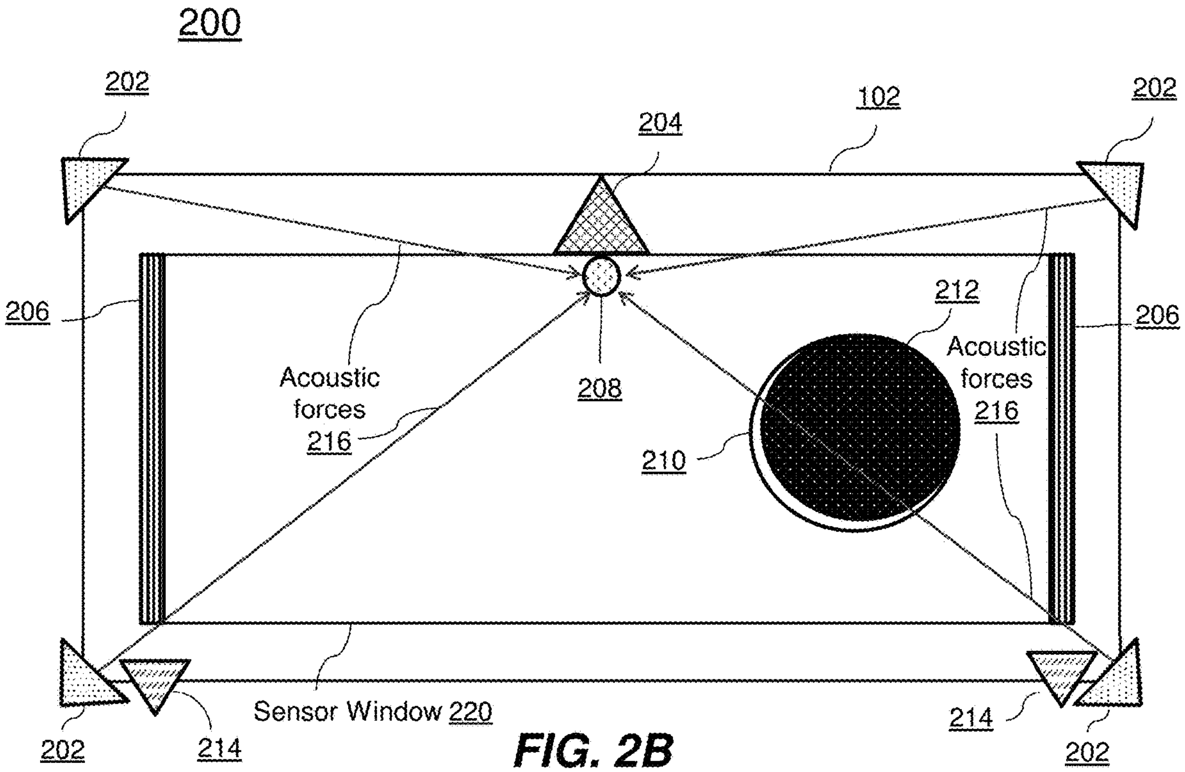
FIG. 2B illustrates an example high-level block diagram for the acousto-vibratory cleaning system, illustrating acoustic forces levitating a fluid droplet, according to an embodiment of the invention.

FIG. 2B illustrates an example high-level block diagram for the acousto-vibratory cleaning system, illustrating acoustic forces levitating a fluid droplet, according to an embodiment. Acoustic forces 216 are directed from the sonic actuators 202 located at the corners of the mounted sensor 102. Acoustic forces 216, or soundwaves, are modulated to a specific frequency, amplitude, and phase based on the fluid properties. Based on the defined volume of the fluid droplet 208, a predetermined frequency, amplitude, and phase may be determined, based on the distance of the sonic actuators 202 and the fluid outlet 204 from which the droplet 208 is released.

The surface of the mounted sensor 102 can be designed with specific properties (e.g., having a predefined frictional coefficient). The window surface is treated with a surface coating using biomimetic techniques to create surface properties replicating the micro-/nanomorphologies from a lotus plant leaf. Lotus plants have superhydrophobic surfaces. Water drops that fall onto them bead up and roll off. Biomimetic techniques enable a surface coating to be applied to the surface of the mounted sensor 102 such that the hydrophobic properties of the lotus leaf are replicated. These surfaces can maintain a high contact angle of more than 150 degrees, low sliding angles of less than 10 degrees and low contact angle hysteresis of less than 10 degrees. The contact angle of the surface is a common measure to quantify adhesiveness of fluids. Additionally, the sensor window 220 is heated by active heating elements for deployment of the system 200 in cold weather.

Figure 2C:
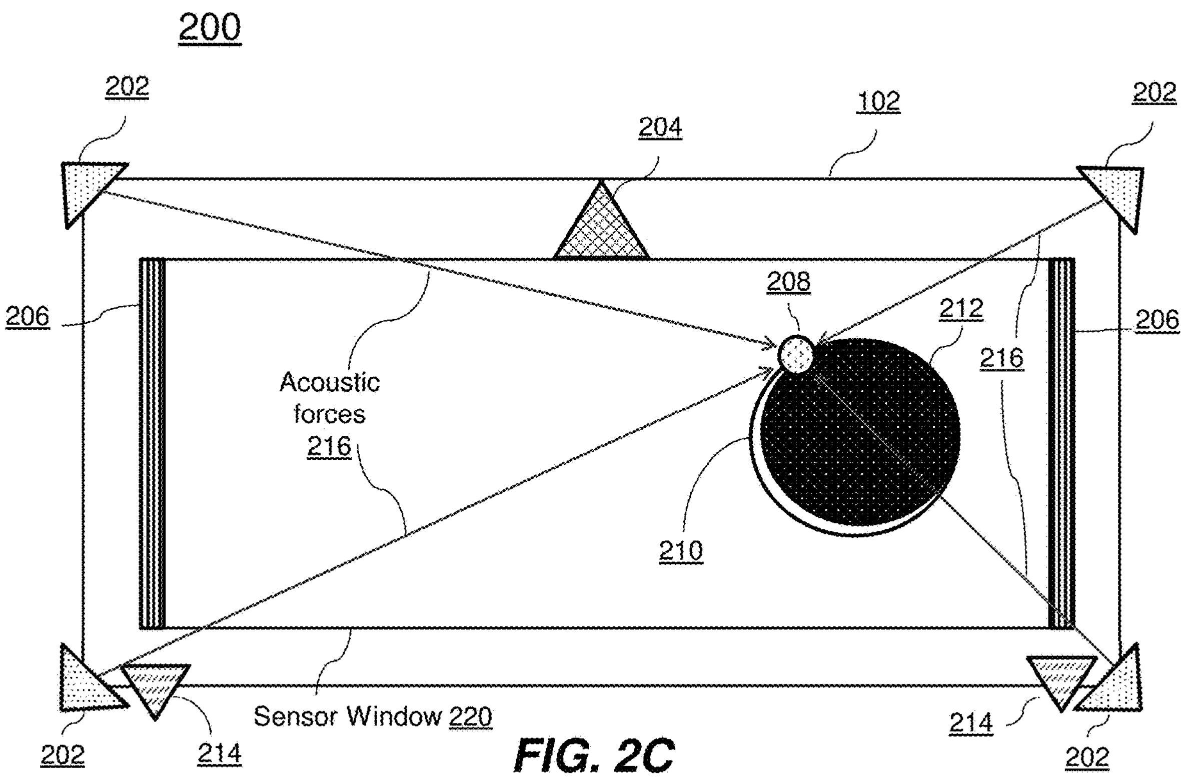
FIG. 2C illustrates an example high-level block diagram for the acousto-vibratory cleaning system, illustrating acoustic forces steering the fluid droplet toward the example obscurant, according to an embodiment of the invention.

FIG. 2B illustrates the acoustic forces 216 directed from the sonic actuators 202 to cause acoustic levitation of the fluid droplet 208. In this way, the sonic actuators 202 operate as a phased array antenna. As the droplet is released to the sensor window 220, the acoustic transducers, or sonic actuators 202, apply the forces to the droplet and steer it in two dimensions on the surface of the sensor window 220. FIG. 2C illustrates an example high-level block diagram for the acousto-vibratory cleaning system, illustrating acoustic forces steering the fluid droplet toward the example obscurant, according to an embodiment. The location of the area to clean is reported by the sensor itself, in an embodiment. The sonic actuator controller 318 delivers a series of instructions to the sonic actuators 202 to accurately steer the fluid droplet 208 to the cleaning position as defined by the detected blocked region 210. The sonic actuator controller 318 modulates the acoustic forces 216 generated by the phased array antenna comprised of the sonic actuators 202 to dynamically steer the droplet 208 towards the detected blocked region 210.

2.4. Mounted Sensor Vibration System

Figure 2D:
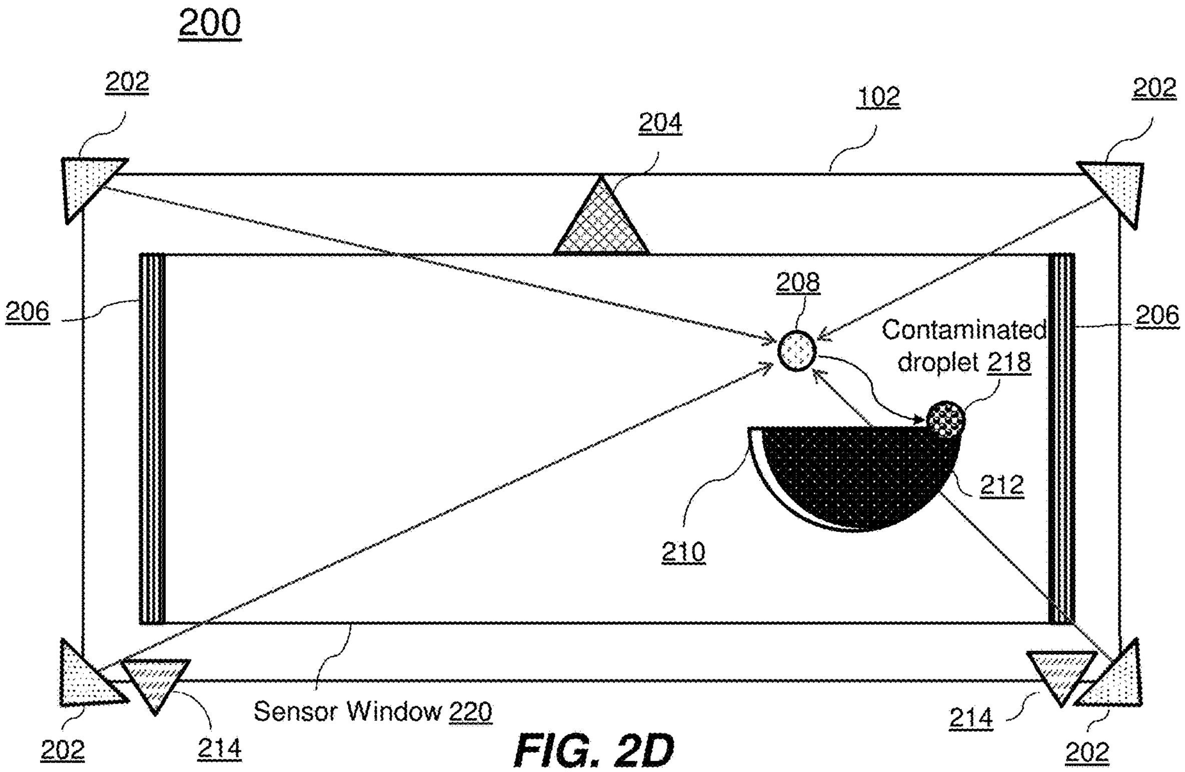
FIG. 2D illustrates an example high-level block diagram for the acousto-vibratory cleaning system, illustrating acoustic forces levitating the fluid droplet and vibration system clearing the obscurant, according to an embodiment of the invention.

FIG. 2D illustrates an example high-level block diagram for the acousto-vibratory cleaning system, illustrating acoustic forces levitating the fluid droplet and vibration system clearing the obscurant, according to an embodiment. Once the droplet 208 reaches the cleaning position as defined by the detected blocked region 210, the sensor window 220 will be brought to oscillating vibratory motion. The sensor surface allows for vibration of up to two millimeters. This displacement is driven by magnetic coils, similar to the mechanical operation of an audio speaker, where the sensor window acts as the oscillating membrane. The vibration may be induced by the magnetic coils on the sensor window frame or by one or more acoustic transducers inside the sensor casing in combination with a flexible sensor window. Alternatively, an array of sonic transducers inside the sensor casing can be used in combination with the magnetic coils to bring the window surface to oscillation. The mounted sensor vibration system 322 of the acousto-vibratory cleaning system 314, as illustrated in FIG. 3, controls the oscillating vibratory motion of the sensor window 220.

The amplitude and frequency of this vibration is optimized based on the fluid properties, specifically droplet resonance modes, interaction between the fluid and the optical surfaces, as well as interaction between the acoustic transducers, or sonic actuators 202, and the droplet 208. By vibrating the droplet 208 along the obscurant 212, the droplet 208 becomes a contaminated droplet 218 by picking up the obscurant 212 incrementally. The directionality of cleaning may be achieved by varying the amplitude and frequency of the vibrating sensor window 220. As shown in FIG. 2D, the contaminated droplet 218 has cleaned half of the original obscurant 212. In an embodiment, the mounted sensor 102 continues to generate data indicating the progress of the cleaning, such that the detected blocked region 210 is continuously updated. In another embodiment, the sensor data may be accessed by the acousto-vibratory cleaning system 314 from the sensor data store 324, as illustrated in FIG. 3.

2.5. Miscellaneous

Figure 2E:
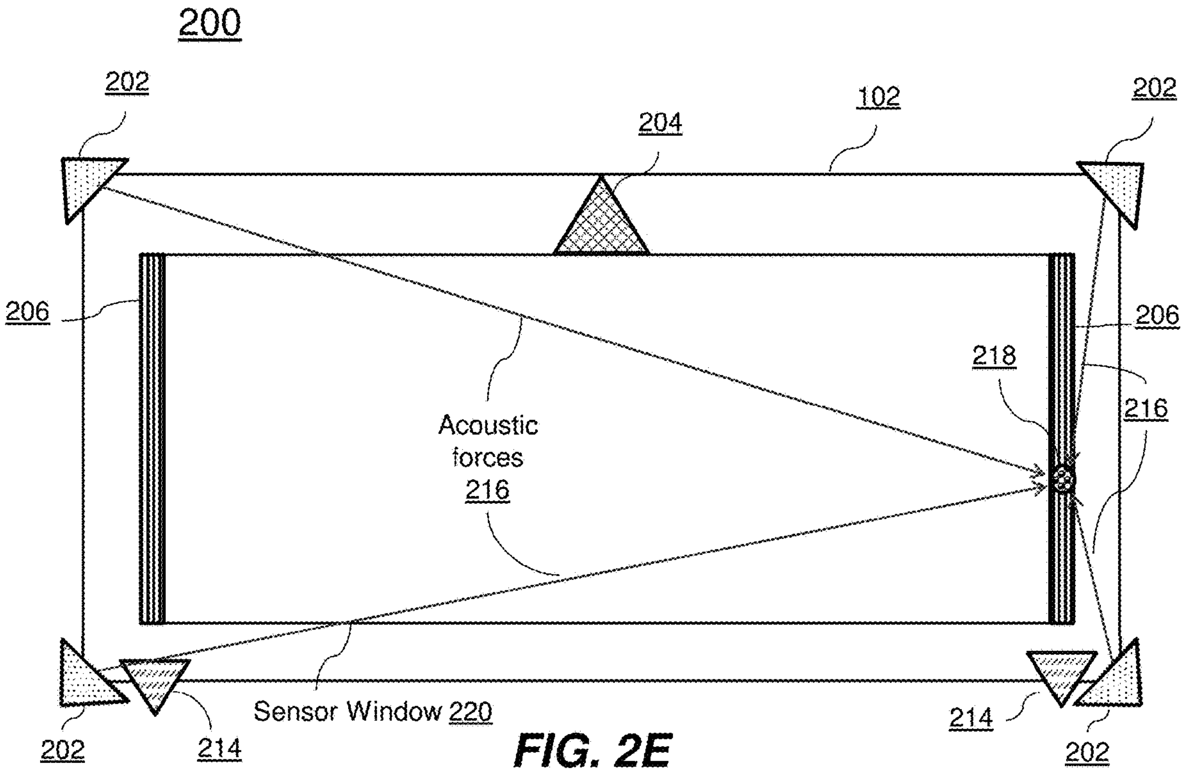
FIG. 2E illustrates an example high-level block diagram for the acousto-vibratory cleaning system, illustrating acoustic forces steering the contaminated fluid droplet to a closest drainage canal, according to an embodiment of the invention.
Figure 2F:
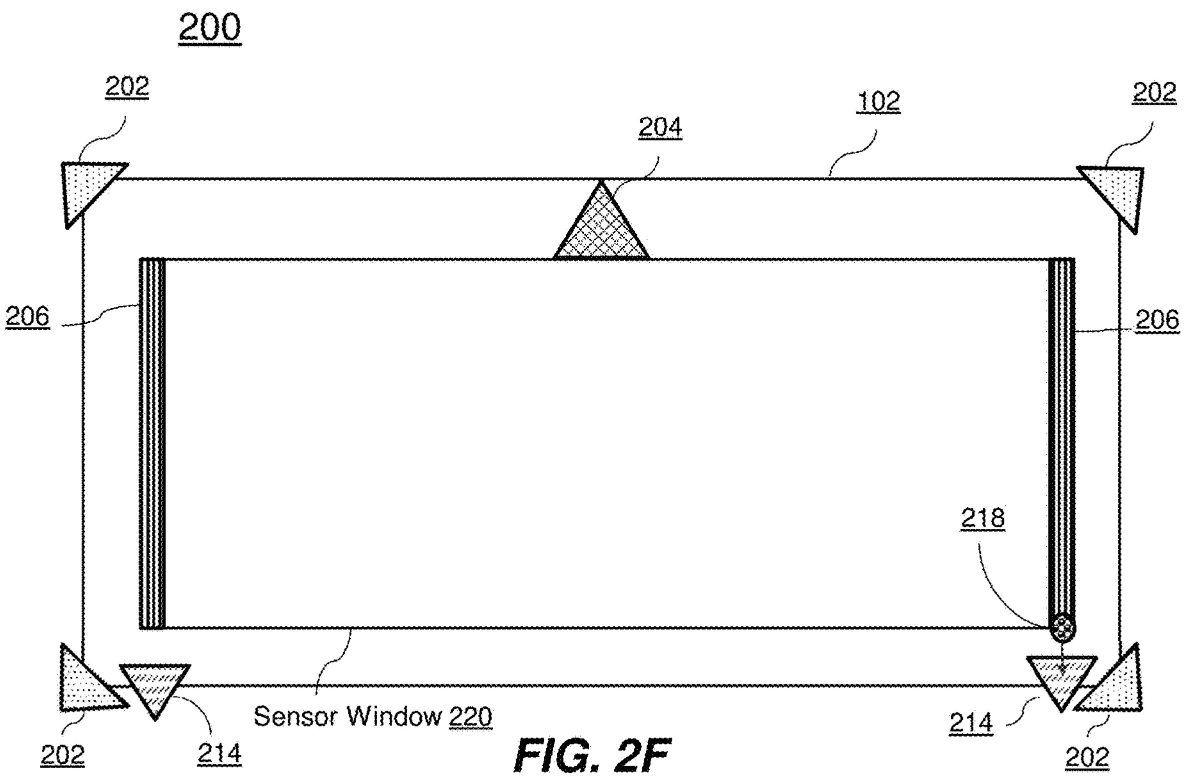
FIG. 2F illustrates an example high-level block diagram for the acousto-vibratory cleaning system, illustrating the contaminated fluid droplet flowing down toward an inlet, according to an embodiment of the invention.

FIG. 2E illustrates an example high-level block diagram for the acousto-vibratory cleaning system, illustrating acoustic forces steering the contaminated fluid droplet to a closest drainage canal, according to an embodiment. The acousto-vibratory cleaning system 314 directs the contaminated droplet 218 using the acoustic forces 216 from the sonic actuators 202. The closest drainage canal 206 is determined based on the location of the previously blocked region 210, in an embodiment. In another embodiment, the sensor 102 detects a location of the contaminated droplet 218 on the sensor window 220 and provides that location to the acousto-vibratory cleaning system 314 such that the sonic actuator controller 318 may steer the contaminated droplet 218 to the closest drainage canal 206. FIG. 2F illustrates an example high-level block diagram for the acousto-vibratory cleaning system, illustrating the contaminated fluid droplet flowing down toward an inlet, according to an embodiment. The contaminated droplet 218 flows downward to an inlet 214 that disposes of the contaminated droplet 218 into a wastewater container. In another embodiment, the inlet 214 disposes of the contaminated droplet 218 to the environment.

System 200 illustrates only one of many possible arrangements of components configured to provide the functionality described herein. Other arrangements may include fewer, additional, or different components, and the division of work between the components may vary depending on the arrangement. For instance, multiple fluid outlets 204 may be installed at the top of the sensor window 220 such that one or more droplets 208 are employed to implement the techniques as described herein. Additionally, a fluid dispenser system 320 may use various types of fluids based on the weather surrounding the vehicle 130. In some operational scenarios, computing devices other than a vehicle computing system as described herein may be used to initiate the acousto-vibratory cleaning system 314, such as a computing system outside of the vehicle 130 connected to the vehicle 130 through the vehicle cloud connectivity system 312. In such an embodiment, the detection of the obscurant may be determined by the computing system outside of the vehicle 130, as an example.

3.0. Functional Overview

In an embodiment, some or all techniques and/or methods described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Obscurant Detection

Detection of an obscurant on the surface of an optical sensor 102 may be performed by one or more vehicle applications 308, as illustrated in FIG. 3. In an embodiment, sensor data may be retrieved from the sensor data store 324 to detect a region of the field of view of an optical sensor 102 being obscured. In another embodiment, the locations of obscured regions on the surface of an optical sensor 102 may be stored in an application data store 326, such that an acousto-vibratory cleaning system 314 may asynchronously perform automated cleaning of the impacted sensor.

In one embodiment, pattern recognition techniques may be used to determine a location of the obscurant on the two-dimensional planar surface of the sensor window 220 of a mounted sensor 102. Pattern recognition techniques may involve artificial intelligence, machine learning, neural networks, and other heuristic analysis for obscurant detection. A computing system other than the vehicle operating system 302 may be used to receive and process sensor data using pattern recognition techniques, in an embodiment, using the vehicle cloud connectivity system 312. The vehicle cloud connectivity system 312 enables the vehicle computing system 302 to connect to one or more networks to receive and transmit data to external systems. Once the location of the region being obscured is detected, the location may be stored in the application data store 326 for use by the acousto-vibratory cleaning system 314 and/or one or more vehicle applications 308.

Though only one layer of computing nodes is illustrated in system 300, the vehicle computing system 302 supports as many layers of computing nodes as needed. Thus, the system 300 may scale without limit to support additional processing needs.

Figure 4A:
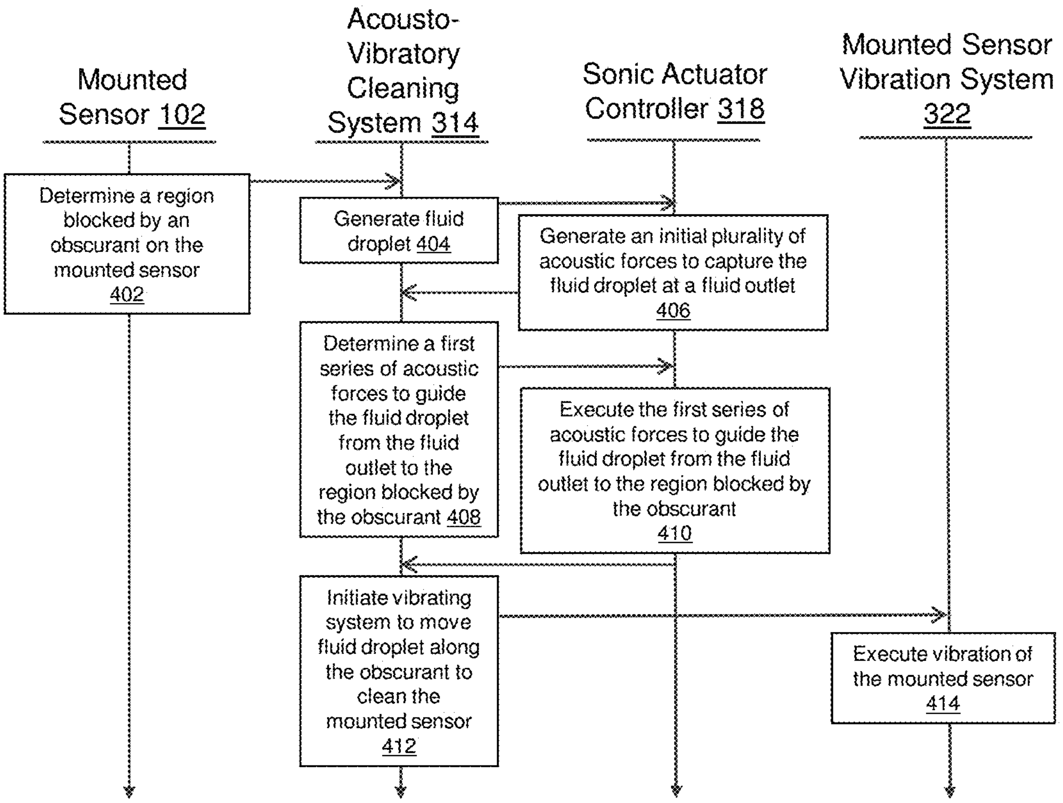
FIG. 4A and FIG. 4B illustrate an example interaction flow diagram, representing an example data flow path for acousto-vibratory sensor cleaning, according to an embodiment of the invention.
Figure 4B:
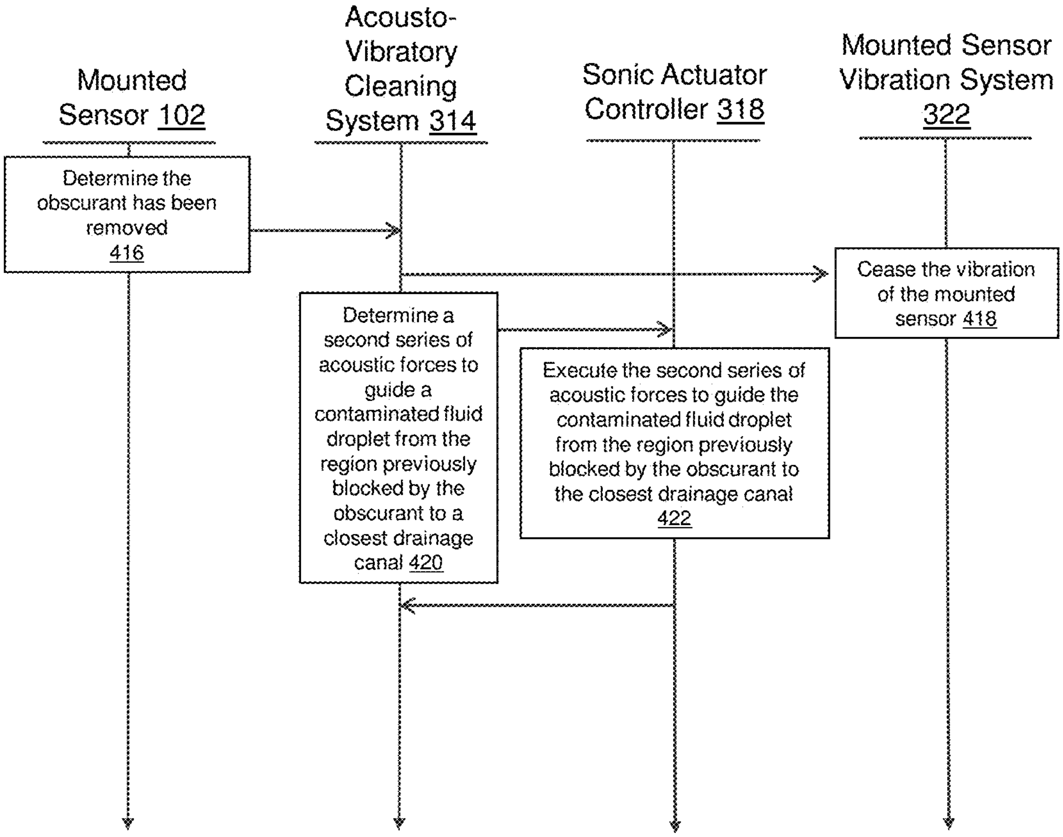

FIG. 4A and FIG. 4B illustrate an example interaction flow diagram, representing an example data flow path for acousto-vibratory sensor cleaning, according to an embodiment. As illustrated in FIG. 4A, a mounted sensor 102 may determine a region blocked by an obscurant on the mounted sensor 402. Alternatively, as described above, a location of the region blocked by an obscurant may be determined 402 by a separate process, such as a vehicle application 308, or other computing system connected to the vehicle 130 through the vehicle cloud connectivity system 312.

An indication of a location of the region blocked by the obscurant is sent to the acousto-vibratory cleaning system 314. The acousto-vibratory cleaning system 314 generates a fluid droplet 404 to begin the cleaning process. The fluid dispenser system 320 of the acousto-vibratory cleaning system 314 generates the fluid droplet using a mechanical system of pumps, in an embodiment. The fluid droplet comprises microliters of fluid, in an embodiment.

3.2. Acoustic Levitation

An indication that a fluid droplet has been generated 404 is sent to the sonic actuator controller 314. In response, an initial plurality of acoustic forces is generated to capture the fluid droplet at a fluid outlet 406. As described above, the initial plurality of acoustic forces is modulated by frequency, amplitude, and phase based on the defined volume of the fluid droplet and the positioning of the sonic actuators 202 in relation to the fluid outlet 204. A set of values for the frequency, amplitude, and phase of the initial plurality of acoustic forces may be predetermined based on the defined volume of the fluid droplet and distance of the fluid droplet from the set of sonic actuators. This initial plurality of acoustic forces generates acoustic levitation, such that the fluid droplet is suspended in air just after being released by the fluid outlet.

An indication of the successful capture, or acoustic levitation, of the fluid droplet by the initial plurality of acoustic forces generated 406 by the sonic actuator controller 318 is sent to the acousto-vibratory cleaning system 314. Next, a first series of acoustic forces is determined to guide the fluid droplet from the fluid outlet to the region blocked by the obscurant 408. Because the surface of the optical sensor has been coated with a biomimetic coating that mimics the hydrophobic properties of a lotus leaf, the fluid droplet may roll along the surface of the sensor window with no friction or loss of fluid volume. Additionally, the first series of acoustic forces may be determined 408 based on the sonic actuators operating as a phased array antenna. Thus, the series of acoustic forces may be computed by the acousto-vibratory cleaning system 314 to guide the fluid droplet to cleaning position at the region blocked by the obscurant, in an embodiment. In another embodiment, the computations involved in determining the first series of acoustic forces may be determined by a separate process, such as a vehicle application 308 or an external computing system connected to the vehicle 130 via the vehicle cloud connectivity system 312. The first series of acoustic forces may be stored as computational data in the application data store 326 for retrieval by the acousto-vibratory cleaning system 314.

The sonic actuator controller 318 then executes the first series of acoustic forces to guide the fluid droplet from the fluid outlet to the region blocked by the obscurant 410. Because the sonic actuator controller 318 comprises one or more computing components, the fluid droplet may be effectively and efficiently steered to the cleaning position very quickly, such as in a matter of seconds. However, the cleaning process may take longer based on the sensor vibration incrementally clearing the obscurant, in an embodiment.

3.3. Sensor Vibration

An indication that the fluid droplet has reached the cleaning position, or the region blocked by the obscurant, is sent to the acousto-vibratory cleaning system 314. The acousto-vibratory cleaning system 314 initiates the mounted sensor vibration system 322 to move the fluid droplet along the obscurant to clean the mounted sensor 412. This initiation includes the location data associated with the region blocked by the obscurant such that the mounted sensor vibration system 322 may vary the oscillation of the sensor window to move the fluid droplet along the obscurant, thus cleaning the mounted sensor. The mounted sensor vibration system 322 receives the instruction from the acousto-vibratory cleaning system 314 and executes vibration of the mounted sensor 414. As described above, the vibration is brought about by magnetic coils in the sensor casing, where the sensor window oscillates as a vibrating membrane. Alternatively, one or more sonic, or acoustic, transducers can be installed within the sensor casing to execute the vibration. The amplitude and frequency of the vibration is dependent on the resonance modes of the fluid droplet, the interaction between the fluid and the surface, as well as the interaction between the acoustic transducers and the droplet. The droplet will vibrate on the sensor surface, effectively capturing obscurants from the sensor window.

As further illustrated in FIG. 4B, the mounted sensor 102 determines the obscurant has been removed 416. This may be determined based on sensor data from the mounted sensor 102, in an embodiment. In another embodiment, a separate process, such as a vehicle application 308 or external computing system connected to the vehicle 130, may determine that the obscurant has been removed 416 using obscurant detection techniques described herein. An indication that the obscurant has been removed is sent to the acousto-vibratory cleaning system 314 which in turn sends an instruction to the mounted sensor vibration system 322 to cease 418 the vibration of the mounted sensor. Alternatively, the mounted sensor vibration system 322 may cease the vibration of the mounted sensor 418 based on completing a predetermined path of the fluid droplet along the obscurant. For example, the detected region of the sensor window that is blocked by the obscurant may be incrementally cleaned by the vibrating fluid droplet by systematically moving the vibrating droplet horizontally along the obscurant from one end of the region to the other, and then moving downwards incrementally, based on the volume of the fluid and the surface interaction with the fluid. Once the predetermined path is complete, the vibration can cease 418. Because the surface of the sensor window has been coated with the hydrophobic substance, the fluid may easily pick up the obscurants, thus cleaning the sensor window.

The acousto-vibratory cleaning system 314 determines a second series of acoustic forces to guide a contaminated fluid droplet from the region previously blocked by the obscurant to a closest drainage canal 420. Similar to step 408 above, the second series of acoustic forces may be determined by a separate process, such as a vehicle application 308 or external computing system connected to the vehicle 130, in an embodiment. Alternatively, the second series of acoustic forces may be computed based on the initially detected region and a predetermined path of the fluid droplet along the obscurant. Based on the now contaminated fluid droplet completing that predetermined path, the second series of acoustic forces may be predetermined and computed using the set of sonic actuators as a phased array antenna. The second series of acoustic forces is then executed by the sonic actuator controller 318 to guide the contaminated fluid droplet from the region previously blocked by the obscurant to the closest drainage canal 422. Upon completion, an indication that the second series of acoustic forces has been executed is sent to the acousto-vibratory cleaning system 314.

3.4. Multiple Droplet Sensor Cleaning

In an embodiment, multiple droplets may be used for sensor cleaning. For example, multiple fluid outlets may be used to generate multiple droplets at the top of the sensor window. As another example, one fluid outlet may generate multiple droplets based on the effectiveness of each droplet in removing the obscurant. Different configurations of sonic actuators 202 may be used to implement multiple droplet sensor cleaning.

4.0. Example Process Flows

Figure 5:
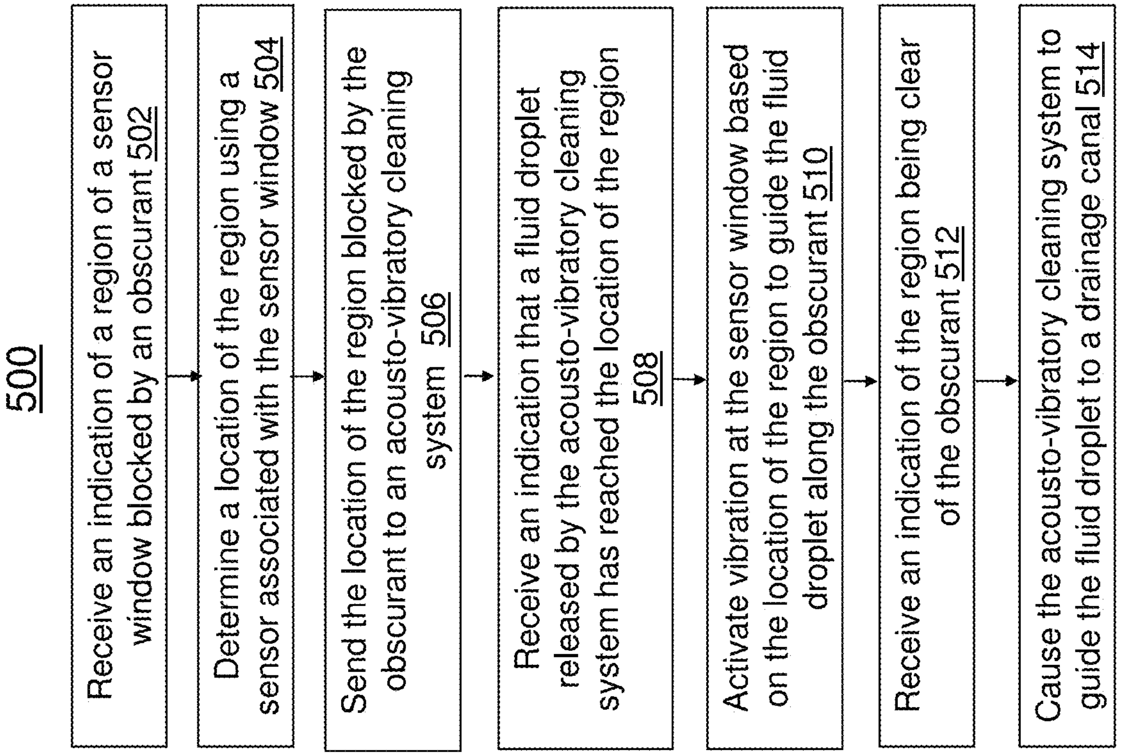
FIG. 5 illustrates an example flow diagram for causing an acousto-vibratory sensor cleaning system to remove an obscurant from a sensor window, according to an embodiment of the invention.

FIG. 5 illustrates example flow 500 for causing an acousto-vibratory sensor cleaning system to remove an obscurant from a sensor window, according to an embodiment. The various elements of flow 500 may be performed in a variety of systems (e.g., one or more computing devices, etc.), including systems such as system 300 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 500 illustrates but one example flow for near real-time decisioning on vehicle data. Other flows may involve additional or fewer steps, in potentially varying arrangements.

Block 502 comprises receiving an indication of a region of a sensor window (e.g., 220 of FIGS. 2A-2F, etc.) blocked by an obscurant (e.g., 212 of FIGS. 2A-2D). The indication of a region being blocked by an obscurant may occur at any time. The detection of the obscurant may be performed by the sensor associated with the sensor window, in one embodiment. In other embodiments, separate processes may be used to detect the obscurant, such as an application or external computing system connected to the sensor. Various techniques may be used in obscurant detection.

Block 504 comprises determining a location of the region using a sensor associated with the sensor window. In an embodiment, the sensor associated with the sensor window determines the location in real-time. In another embodiment, the sensor associated with the sensor window generates data that is processed asynchronously by a separate process. In a further embodiment, the location of the region has been determined and is retrieved from an application data store. In a further embodiment, a separate sensor is used to determine the location of the region on the sensor window that includes the obscurant.

Block 506 comprises sending the location of the region blocked by the obscurant to an acousto-vibratory cleaning system. In an embodiment, the location of the region may be retrieved by the acousto-vibratory cleaning system from an application data store. In another embodiment, the location of the region may be sent in real-time by the sensor associated with the sensor window.

Block 508 comprises receiving an indication that a fluid droplet released by the acousto-vibratory cleaning system has reached the location of the region. The indication that the fluid droplet has reached the location of the region may be generated by the sensor associated with the sensor window. In another embodiment, the indication that the fluid droplet has reached the location of the region may be generated by the sonic actuator controller of the acousto-vibratory cleaning system based on a computation of the path traveled by the fluid droplet and the phased array antenna comprising the at least three sonic actuators fully completing the path.

Block 510 comprises activating vibration at the sensor window based on the location of the region to guide the fluid droplet along the obscurant. The vibration is activated by the mounted sensor vibration system which includes magnetic coils embedded in the sensor casing that can be activated to vibrate the flexible sensor window, in an embodiment. The vibration, in another embodiment, is activated by the mounted sensor vibration system that includes one or more acoustic transducers in the sensor casing. The vibration is modulated on frequency and amplitude based on the fluid properties, specifically resonance modes of the fluid droplet, the interaction of the surface of the sensor window and the fluid, as well as the effect of the acoustic transducers on the fluid droplet.

Block 512 comprises receiving an indication of the region being clear of the obscurant. This indication may be generated by the sensor associated with the previously obscured sensor window in real-time, in an embodiment. The indication of the region being clear may also be generated by a separate process, using an application or external computing system, that analyzes the data generated from the sensor associated with the sensor window.

Block 514 comprises causing the acousto-vibratory cleaning system to guide the fluid droplet to a drainage canal. The acousto-vibratory cleaning system may guide the fluid droplet to the closest drainage canal, in an embodiment, using the acoustic levitation techniques described above with the at least three acoustic forces emitted from the at least three sonic actuators. Additionally, the acousto-vibratory cleaning system may use a precomputed path to the closest drainage canal based on the location of the region initially provided.

In an embodiment, a computing device is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Other examples of these and other embodiments are found throughout this disclosure. Note that, although separate embodiments are discussed herein, any combination of embodiments and/or partial embodiments discussed herein may be combined to form further embodiments.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 6:
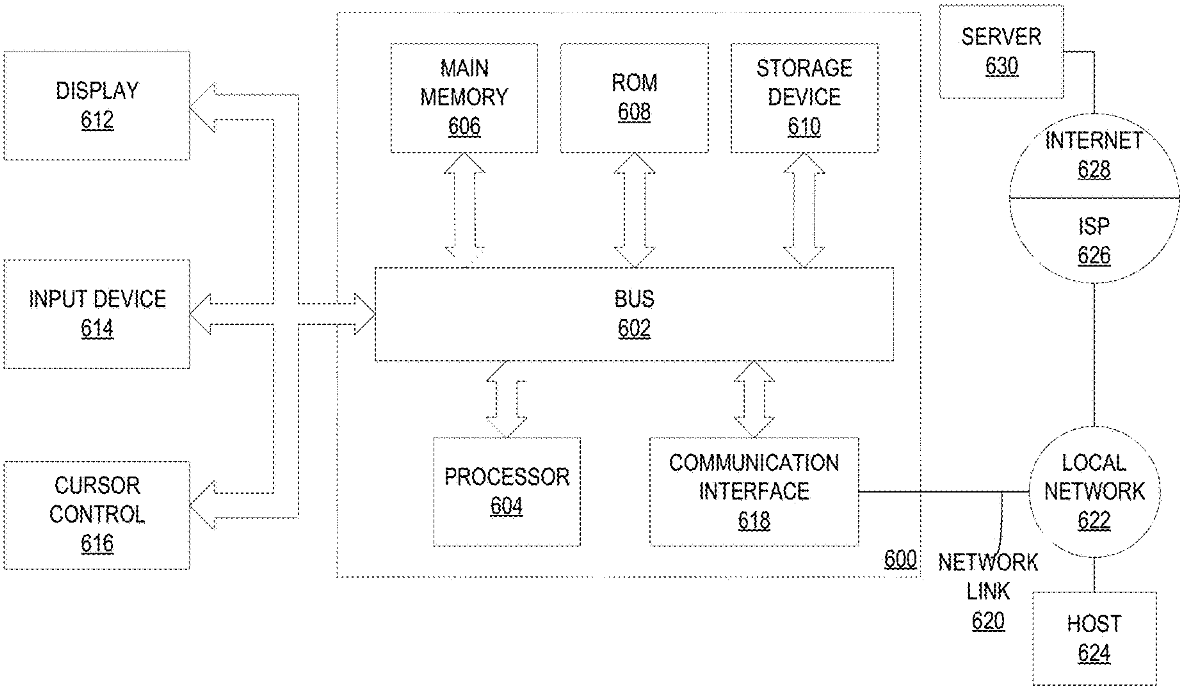
FIG. 6 is block diagram of a computer system upon which embodiments of the invention may be implemented.

FIG. 6 is a block diagram that illustrates a computer system 600 utilized in implementing the above-described techniques, according to an embodiment. Computer system 600 may be, for example, a desktop computing device, laptop computing device, tablet, smartphone, server appliance, computing main image, multimedia device, handheld device, networking apparatus, or any other suitable device.

Computer system 600 includes one or more busses 602 or other communication mechanism for communicating information, and one or more hardware processors 604 coupled with busses 602 for processing information. Hardware processors 604 may be, for example, a general purpose microprocessor. Busses 602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 600 also includes a main memory 606, such as a random access memory (RAM) or other dynamic or volatile storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes one or more read only memories (ROM) 608 or other static storage devices coupled to bus 602 for storing static information and instructions for processor 604. One or more storage devices 610, such as a solid-state drive (SSD), magnetic disk, optical disk, or other suitable non-volatile storage device, is provided and coupled to bus 602 for storing information and instructions.

Computer system 600 may be coupled via bus 602 to one or more displays 612 for presenting information to a computer user. For instance, computer system 600 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 612.

In an embodiment, output to display 612 may be accelerated by one or more graphics processing unit (GPUs) in computer system 600. A GPU may be, for example, a highly parallelized, multi-core floating point processing unit highly optimized to perform computing operations related to the display of graphics data, 3D data, and/or multimedia. In addition to computing image and/or video data directly for output to display 612, a GPU may also be used to render imagery or other video data off-screen, and read that data back into a program for off-screen image processing with very high performance. Various other computing tasks may be off-loaded from the processor 604 to the GPU.

One or more input devices 614 are coupled to bus 602 for communicating information and command selections to processor 604. One example of an input device 614 is a keyboard, including alphanumeric and other keys. Another type of user input device 614 is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet other examples of suitable input devices 614 include a touch-screen panel affixed to a display 612, cameras, microphones, accelerometers, motion detectors, and/or other sensors. In an embodiment, a network-based input device 614 may be utilized. In such an embodiment, user input and/or other information or commands may be relayed via routers and/or switches on a Local Area Network (LAN) or other suitable shared network, or via a peer-to-peer network, from the input device 614 to a network link 620 on the computer system 600.

A computer system 600 may implement techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 600 can receive the data on the network and demodulate the signal to decode the transmitted instructions. Appropriate circuitry can then place the data on bus 602. Bus 602 carries the data to main memory 605, from which processor 604 retrieves and executes the instructions. The instructions received by main memory 606 may optionally be stored on storage device 610 either before or after execution by processor 604.

A computer system 600 may also include, in an embodiment, one or more communication interfaces 618 coupled to bus 602. A communication interface 618 provides a data communication coupling, typically two-way, to a network link 620 that is connected to a local network 622. For example, a communication interface 618 may be an integrated services digital network (ISDN) card, cable modem, satellite modem, or a modem to provide a data communication connection to a corresponding type of telephone line. As another example, the one or more communication interfaces 618 may include a local area network (LAN) card to provide a data communication connection to a compatible LAN. As yet another example, the one or more communication interfaces 618 may include a wireless network interface controller, such as a 802.11-based controller, Bluetooth controller, Long Term Evolution (LTE) modem, and/or other types of wireless interfaces. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by a Service Provider 626. Service Provider 626, which may for example be an Internet Service Provider (ISP), in turn provides data communication services through a wide area network, such as the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

In an embodiment, computer system 600 can send messages and receive data, including program code and/or other types of instructions, through the network(s), network link 620, and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. As another example, information received via a network link 620 may be interpreted and/or processed by a software component of the computer system 600, such as a web browser, application, or server, which in turn issues instructions based thereon to a processor 604, possibly via an operating system and/or other intermediate layers of software components.

In an embodiment, some or all of the systems described herein may be or comprise server computer systems, including one or more computer systems 600 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for sensor cleaning, the method comprising:
- receiving an indication of a region of a sensor window blocked by an obscurant;
- determining a location of the region using a sensor associated with the sensor window;
- sending the location of the region to an acousto-vibratory cleaning system;
- releasing a fluid droplet onto the sensor window;
- guiding the fluid droplet to the location of the region by the acousto-vibratory cleaning system;
- receiving an indication that the fluid droplet has reached the location of the region;
- activating vibration at the sensor window based on the location of the region, the vibrating sensor window moving the fluid droplet along the obscurant to capture the obscurant in the fluid droplet;
- in response to receiving an indication of the region being clear of the obscurant, causing the acousto-vibratory cleaning system to guide the fluid droplet to a drainage canal.

2. The method of claim 1, wherein the indication of the region of the sensor window being blocked by the obscurant is generated by the sensor associated with the sensor window.

3. The method of claim 1, wherein the indication of the region of the sensor window being blocked by the obscurant is generated by an application that processed data generated by the sensor.

4. The method of claim 1, wherein the sensor is mounted on a vehicle configured to generate a passive air curtain that shields the sensor from direct airflow pressure.

5. The method of claim 1, wherein the acousto-vibratory cleaning system comprises at least three sonic actuators that emit a plurality of acoustic forces to suspend the fluid droplet.

6. The method of claim 1, wherein the sensor window is coated with a hydrophobic substance that enables the fluid droplet to remove the obscurant.

7. The method of claim 1, wherein the acousto-vibratory cleaning system guides the fluid droplet across the sensor window using at least three sonic actuators as a phased array antenna.

8. One or more non-transitory computer-readable media, storing one or more sequences of instructions, wherein execution of the one or more sequences of instructions by one or more processors causes the one or more processors to perform:
- receiving an indication of a region of a sensor window blocked by an obscurant;
- determining a location of the region using a sensor associated with the sensor window;
- sending the location of the region to an acousto-vibratory cleaning system;
- releasing a fluid droplet onto the sensor window;
- guiding the fluid droplet to the location of the region by the acousto-vibratory cleaning system;
- receiving an indication that the fluid droplet has reached the location of the region;
- activating vibration at the sensor window based on the location of the region, the vibrating sensor window moving the fluid droplet along the obscurant to capture the obscurant in the fluid droplet;
- in response to receiving an indication of the region being clear of the obscurant, causing the acousto-vibratory cleaning system to guide the fluid droplet to a drainage canal.

9. The one or more non-transitory computer readable media of claim 8, wherein the indication of the region of the sensor window being blocked by the obscurant is generated by the sensor associated with the sensor window.

10. The one or more non-transitory computer readable media of claim 8, wherein the indication of the region of the sensor window being blocked by the obscurant is generated by an application that processed data generated by the sensor.

11. The one or more non-transitory computer readable media of claim 8, wherein the sensor is mounted on a vehicle configured to generate a passive air curtain that shields the sensor from direct airflow pressure.

12. The one or more non-transitory computer readable media of claim 8, wherein the acousto-vibratory cleaning system comprises at least three sonic actuators that emit a plurality of acoustic forces to suspend the fluid droplet.

13. The one or more non-transitory computer readable media of claim 8, wherein the sensor window is coated with a hydrophobic substance that enables the fluid droplet to remove the obscurant.

14. The one or more non-transitory computer readable media of claim 8, wherein the acousto-vibratory cleaning system guides the fluid droplet across the sensor window using at least three sonic actuators as a phased array antenna.

15. A system, comprising:
- one or more computing processors;
- a memory storing instructions, which when executed by the one or more processors, cause the one or more processors to perform:
  - receiving an indication of a region of a sensor window blocked by an obscurant;
  - determining a location of the region using a sensor associated with the sensor window;
  - sending the location of the region to an acousto-vibratory cleaning system;
  - releasing a fluid droplet onto the sensor window;
  - guiding the fluid droplet to the location of the region by the acousto-vibratory cleaning system;
  - receiving an indication that the fluid droplet has reached the location of the region;
  - activating vibration at the sensor window based on the location of the region, the vibrating sensor window moving the fluid droplet along the obscurant to capture the obscurant in the fluid droplet;

in response to receiving an indication of the region being clear of the obscurant, causing the acousto-vibratory cleaning system to guide the fluid droplet to a drainage canal.

16. The system of claim 15, wherein the indication of the region of the sensor window being blocked by the obscurant is generated by the sensor associated with the sensor window.

17. The system of claim 15, wherein the indication of the region of the sensor window being blocked by the obscurant is generated by an application that processed data generated by the sensor.

18. The system of claim 15, wherein the acousto-vibratory cleaning system comprises at least three sonic actuators that emit a plurality of acoustic forces to suspend the fluid droplet.

19. The system of claim 15, wherein the sensor window is coated with a hydrophobic substance that enables the fluid droplet to remove the obscurant.

20. The system of claim 15, wherein the acousto-vibratory cleaning system guides the fluid droplet across the sensor window using at least three sonic actuators as a phased array antenna.

* * * * *